UNITED STATES PATENT OFFICE.

EDMUND CHARLES ROSSITER, OF LANGLEY GREEN, AND HORACE WOODWARD CROWTHER, OF WEST BROMWICH, ENGLAND, ASSIGNORS TO BRITISH CYANIDES COMPANY, LIMITED, OF OLDBURY, ENGLAND.

PROCESS OF MAKING CYANIDS.

SPECIFICATION forming part of Letters Patent No. 688,793, dated December 10, 1901.

Application filed April 29, 1901. Serial No. 58,047. (No specimens.)

*To all whom it may concern:*

Be it known that we, EDMUND CHARLES ROSSITER, chemist, residing at Langley Green, near Birmingham, and HORACE WOODWARD CROWTHER, chemist, residing at the Beeches, West Bromwich, England, subjects of the King of Great Britain, have invented certain new and useful Cyanids of the Alkalies, of which the following is a specification.

We have found that when the metallic cyanids (either simple or double) are heated to a suitable temperature in the presence of hydrogen the cyanogen is given off in the form of hydrocyanic acid. This gas we absorb in caustic alkali. Two particularly suitable compounds are ferric ferrocyanid (Prussian blue) and cyanid of zinc. In the case of the ferrocyanids of the alkalies and alkaline earths the reaction is only partial.

The cyanid is introduced into a vessel in which the material can be agitated either by the motion of the vessel itself or by internal agitators, and a current of hydrogen freed as far as this can conveniently be done from moisture is then passed through the vessel until the air is displaced. The vessel is heated first at a temperature below 150° centigrade to drive off any moisture. The temperature is then raised to 200° and gradually to 450° centigrade, and after most of the reaction has taken place to from 450° to 600° centigrade, the stream of hydrogen being passed through the whole of the time. The gas which leaves the vessels, consisting of hydrocyanic-acid gas mixed with the excess of hydrogen, is drawn through vessels containing a solution of caustic alkali, (potash or soda,) whereby the hydrocyanic acid is absorbed, and the excess of hydrogen may be passed on to a suitable storage. Owing to the poisonous nature of hydrocyanic-acid gas it is advisable to carry on the operation under diminished pressure. The mixed gases are passed through until the caustic is converted into a cyanid of the alkali. This solution is then boiled down in vacuum-pans to obtain a solid cyanid.

Besides the use of the hydrogen prepared by well-known methods the hydrogen may be in the form of a gas containing hydrogen— such as coal-gas or producer or water gas— providing such gases are freed from oxygen, carbonic acid, and moisture before use.

What we claim is—

1. The manufacture of the cyanids of the alkalies by heating a metallic cyanid in the presence of hydrogen and absorbing the hydrocyanic-acid gas so produced in caustic alkali.

2. The manufacture of the cyanids of the alkalies by heating to a temperature of from 200° centigrade to 600° centigrade a metallic cyanid in the presence of hydrogen and absorbing the hydrocyanic-acid gas so produced in caustic alkali.

3. The manufacture of the cyanids of the alkalies by heating a ferric ferrocyanid in the presence of hydrogen and absorbing the hydrocyanic-acid gas so produced in caustic alkali.

4. The manufacture of the cyanids of the alkalies by heating to a temperature of from 200° centigrade to 600° centigrade a ferric ferrocyanid in the presence of hydrogen and absorbing the hydrocyanic-acid gas so produced in caustic alkali.

EDMUND CHARLES ROSSITER.
HORACE WOODWARD CROWTHER.

Witnesses:
JAMES RICHARDSON HOLLIDAY,
WALTER COOPER.